United States Patent [19]

Yamamori et al.

[11] Patent Number: 5,199,977

[45] Date of Patent: Apr. 6, 1993

[54] ANTIFOULING PAINT COMPOSITIONS

[75] Inventors: Naoki Yamamori, Minou; Junji Yokoi; Kiyoaki Higo, both of Ikoma; Masayuki Matsuda, Osaka, all of Japan

[73] Assignee: Nippon Paint Company, Ltd., Osaka, Japan

[21] Appl. No.: 732,882

[22] Filed: Jul. 19, 1991

[30] Foreign Application Priority Data

Jul. 19, 1990 [JP] Japan ............................. 2-192213
Jul. 19, 1990 [JP] Japan ............................. 2-192214
Jul. 19, 1990 [JP] Japan ............................. 2-192215

[51] Int. Cl.$^5$ ............................................. C09D 5/14
[52] U.S. Cl. ........................... 106/15.05; 106/18.32; 106/18.33; 106/18.34; 106/18.36; 424/78.09; 523/122; 525/386; 525/408
[58] Field of Search ............ 106/15.05, 18.32, 18.33, 106/18.34, 18.36; 424/78.09; 523/122; 525/386, 408

[56] References Cited

U.S. PATENT DOCUMENTS

| | | | |
|---|---|---|---|
| 4,554,185 | 11/1985 | Lane et al. | 106/18.32 |
| 4,576,838 | 3/1986 | Rosen et al. | 106/15.05 |
| 4,596,724 | 6/1986 | Lane et al. | 106/18.32 |
| 4,626,283 | 12/1986 | Martins et al. | 106/18.34 |
| 4,774,080 | 9/1988 | Yamamori et al. | 523/122 |
| 4,918,147 | 4/1990 | Yamamori et al. | 523/122 |

FOREIGN PATENT DOCUMENTS 1-016809 1/1989 Japan .

Primary Examiner—Karl Group
Assistant Examiner—Anthony J. Green
Attorney, Agent, or Firm—Millen, White, Zelano and Branigan

[57] ABSTRACT

An antifouling paint containing a copolymer including a recurring unit of the formula:

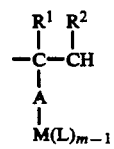

wherein $R^1$ is hydrogen atom, methyl or an alkoxycarbonyl, $R^2$ is hydrogen atom or an alkoxycarbonyl, A is an acid ion-terminated pendant group, M is a transitional metal ion, L is a monobasic organic acid ion, and m is the valency of the transitional metal M; and an amount of an organic ligand capable of coordinating to the transitional metal. The ion-association and reactivity of the metal in the copolymer may be retarded by complexing with the organic ligand in situ.

12 Claims, No Drawings

ANTIFOULING PAINT COMPOSITIONS

BACKGROUND OF THE INVENTION

This invention relates to a novel antifouling paint composition.

Antifouling paints containing as a vehicle resin a trialkyltin group-containing polymer are known as "self-polishing antifouling paints". When these paints are applied onto ships as a coating film, the film is gradually hydrolyzed by the action of weakly alkaline sea water to release the trialkyltin moiety at a constant rate for a long period of time, and at the same time the remaining film may be rendered water-soluble to expose a fresh surface of the tin-containing polymer. This smoothens the film surface consistently, decreases the frictional resistance of the ships and, therefore, economizes fuel consumption.

The tin-containing polymers used in the known self-polishing antifouling paints consist typically of copolymers of trialkyltin acrylate or methacrylate with other ethylenically unsaturated monomers.

However, ecological concern of massive release of organotin compounds into sea water makes the tin-based antifouling paints undesirable and a need arises for a new vehicle resin usable in the self-polishing antifouling paints.

In Japanese Patent Kokai No. 16809/1989 published on Jan. 20, 1989 and assigned to the assignee of the present application, a metal-containing polymer is disclosed comprising a multivalent, metal salt of acrylic or methacrylic acid copolymers with a monobasic organic acid bound to the same metal ion to which the acrylate or mathacrylate anion is bound.

It has been found, however, that this type of metal-containing polymers are liable to ion-association and tend to react with antifouling agents such as cuprous oxide or copper rhodanide or metal oxide pigments such as zinc oxide when formulated them together in an antifouling paint. Consequently, the paint formulations will become gelled or too viscous upon storage making them commercially impractical.

Accordingly, it is a major object of this invention to provide a self-polishing antifouling paint of the above type which is free from these problems and is compatible with conventional antifouling agents or conventional metal oxide pigments.

SUMMARY OF THE INVENTION

The above and other objects are accomplished by the present invention by providing an antifouling paint composition comprising:

(a) a copolymer consisting essentially of 5 to 80% weight of a first recurring unit of the formula:

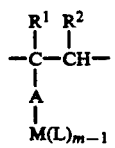

wherein $R^1$ is hydrogen atom, methyl or an alkoxycarbonyl, $R^2$ is methyl or an alkoxycarbonyl, A is an acid ion-terminated pendant group, M is a transitional metal ion, L is a monobasic organic acid ion, and m is the valency of the transitional metal M; and the balance of the copolymer of a second recurring unit free from an acid function, said copolymer having a number average molecular weight from 2,000 to 100,000; and (b) an amount of an organic ligand at least equal to the ligand-to-metal coordination ratio of 1:1, said organic ligand being selected from the group consisting of aromatic nitro compounds, nitriles, urea compounds, alcohols, phenols, aldehydes, ketones, carboxylic acids and organic sulfur compounds.

The above copolymer (a) may be considered as a hybrid salt.

By coordinating an organic ligand to each metal atom, the ion-association of the hybrid salt is retarded significantly to have a lower viscosity in a solution compared with the corresponding solution not containing the organic ligand. Furthermore, improvements may be found both in the sustained release of metal ions and the film consumption rate. Another important advantage is the fact that the complexed hybrid salt is no longer reactive with conventional antifouling agents and pigments such as cuprous oxide, zinc oxide and the like. Therefore, the antifouling paint composition of the present invention is compatible with the conventional antifouling agents and pigments.

DETAILED DISCUSSION

The polymeric hybrid salt containing the recurring unit of the formula

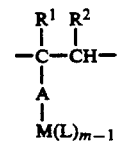

wherein all symbols are as defined, may be preferably produced by copolymerizing a corresponding acidic monomer and a corresponding neutral monomer, and then reacting the resulting polymeric acid with a compound of transitional metal and a monobasic organic acid.

Typical examples of carboxylic acid monomers are acrylic acid and methacrylic acid, which are hereinafter collectively referred to as "(meth)acrylic acid". Other examples of carboxyl group-containing monomers include monoalkyl maleate and monoalkyl itaconate as well as half esters of a dicarboxylic acid such as phthalic, succinic or maleic acid with a hydroxyl group-containing monomer such as 2-hydroxylethyl (meth)acrylate.

Examples of sulfonic group-containing monomers include p-styrenesulfonic acid, 2-methyl-2-acrylamidopropanesulfonic acid and the like.

Examples of phosphoric group-containing monomers include acid phosphoxyethyl methacrylate, acid phosphoxypropyl methacrylate, 2-acid phosphosphoxy-3-chloropropyl methacrylate and the like.

Examples of neutral monomers include hydrocarbon monomers such as ethylene, propylene, styrene, α-methylstyrene, vinyltoluene and t-butylstyrene; alkyl (meth)acrylates such as methyl (meth)acrylate, ethyl (meth)acrylate, n-butyl (meth)acrylate and 2-ethylhexyl (meth)acrylate; hydroxyalkyl (meth)acrylate such as 2-hydroxyethyl (meth)acrylate, 2-hydroxypropyl (meth)acrylate and hydroxybutyl (meth)acrylate; other monomers such as (meth)acrylamide, (meth)acrylonitrile, vinyl acetate, vinyl propionate, vinyl chloride and the like.

By solution copolymerizing the acidic monomers and the neutral monomers, copolymers having a plurality of acid-terminated pendant groups may be produced.

Transitional metals, namely elements of groups 3A to 7A, 8 and 1B, may be used for forming a salt with the polymeric acid. Co, Ni, Cu, Zn or Mn is preferable among others.

The polymer hybrid salts may be produced by reacting the acid-terminated pendant group-containing polymer or an alkali metal salt thereof with an organic monobasic acid corresponding to the ligand L and an oxide, hydroxide, chloride, sulfide or basic carbonate of the transitional metal. Alternatively, the acid-terminated pendant group-containing polymer may be reacted with the organic monobasic acid salt of a transitional metal. It is also possible to copolymerize a corresponding monomeric hybrid salt with a neutral monomer.

Examples of monobasic organic acids usable for forming the hybrid salt include monocarboxylic acids such as acetic, propionic, butyric, lauric, stearic, linolic, olei, naphthenic, chloroacetic fluoroacetic, abietic, phenoxyacetic, valeric, dichlorophenoxyacetic, benzoic or napthoic acid; and monosulfonic acids such as benzenesulfonic, p-toluenesulfonic, dodecylbenzenesulfonic, naphthalenesulfonic or p-phenylbenzenesulforic acid.

A preferred method for producing the polymeric hybrid salt has been disclosed in Japanese Patent Kokai No. 16809/1989 cited hereinbefore. According to this method, copolymers containing pendant acid groups are reacted with a metal salt of low boiling point-monobasic organic acid and a high boiling point-monobasic organic acid simultaneously to form a hydbrid salt in which both the polymer pendant acid anion and the high boiling point-monobasic acid anion are bound to the same transitional metal cation. For example, a hybrid copper salt with the polymeric acid and naphthenic acid may be obtained by reacting the polymeric acid with cupric acetate and naphthenic acid.

The polymer hybrid salts thus produced take a pseudo-crosslinked form due to ion-association and, therefore, have a relatively high viscosity in solutions. However, the viscosity may be decreased significantly by coordinating a further ligand to the hybrid salt in accordance with the present invention. The resulting polymer complex thus formed also exhibits a relatively constant rate both in metal release and film consumption when applied as an antifouling coating film.

Organic ligands used for this purpose are selected from the group consisting of aromatic nitro compounds, urea compounds, nitriles, alcohols, phenols, aldehydes, ketones, carboxylic acids, and organic sulfur compounds.

The organic ligands usable in the present invention are not limited to unidentate ligands but include polydentate ligand containing a plurality of same or different ligating atoms in the molecule.

Specific examples of such ligands include aromatic nitro, compounds such as nitrobenzene; nitriles such as isophthalonitrile; urea compounds such as urea, thiourea, N-(3,4-dichlophenyl)-N'-methoxy-N'-methylurea or N-(3,4-dichlorophenyl)-N', N'-dimethylurea; alcohols such as butanol, octanol or geraniol; phenols such as hydroquinone, hydroquinone monomethyl ether, nonylphenol or BHT; aldehydes such as acetaldehyde or propionaldehyde; ketones such as acetylacetone, acetophenone or 2-amino-3-chloro-1,4-naphthoquine; carboxylic acids such as acetic, propionic, benzoic, lactic, malic, citric or tartaric acid or glycine; and sulfur compounds such as thiophene and its derivatives, n-propyl p-toluenesulfonate, mercaptobenzothiazole, dimethyldithiocarbamate or benzeneisothiocyanate. Some of these ligands are used for antifouling purposes in the conventional antifouling paint formulations.

The amount of organic ligand for complexing the polymer hybrid salt should be equal to or in excess of the ligand-to-metal coordination ratio of 1:1. The maximum will be such an amount to saturate the coordination number of a particular metal used. For example, when a metal specis having a coordination number of 4 is used, one or two moles of unidentate ligands or one mole of bidentate ligand may be coordinated to the metal atom.

The organic ligands are incorparated to a solution or varnish of the polymer hybrid salt to form a polymer complex in situ. The presence of excessive amounts of the organic ligands may be tolerated unless coating films are adversely affected such as occurrence of cracks or blisters when soaked in saline.

The complexed copolymer used in the antifouling paint of this invention consists essentially of 5 to 80%, preferably from 20 to 70% by weight of the copolymer of the first recurring unit (a), and the balance of the copolymer of the second recurring unit. If the proportion of the first recurring unit is too high, then the resulting film will be consumed too rapidly. Conversely, if the proportion of the first recurring unit is too low, then the resulting films will not be self-polishing.

The complexed copolymer used herein should have a number average molecular weight from 4,000 to 100,000. Within this range of molecular weight, the copolymer will have an optimal viscosity for film-forming and workability purposes. However, since the viscosity is relatively low, the complexed copolymer may be formulated into high solids paints.

The complexed copolymer may have a metal content from 0.3 to 20%, preferably from 0.5 to 15% by weight.

The antifouling paint composition of the present invention may contain, in addition to the complexed copolymer, any conventional antifouling agent such as cuprous oxide or copper rhodanide as well as any conventional pigment such as zinc oxide, titanium oxide or iron oxide. Since the complexed copolymer is no longer reative with these additives, the composition is stable upon storage for a long period of time.

The invention is further illustrated by the following examples in which all percents and parts are by weight unless otherwise specified.

PRODUCTION OF COPOLYMERS CONTAINING PENDANT ACID GROUPS

Example 1

To a four necked flask equipped with a stirrer, a reflux condenser and a dripping funnel were added 120 parts of xylene and 30 parts of n-butanol, and the content was heated to 110°–120° C. To this was added dropwise a mixture of 60 parts of hexyl acrylate, 25 parts of 2-ethylhexyl acrylate, 15 parts of acrylic acid and 2 parts of azobisisobutyronitrile over three hours. After the addition, the mixture was kept at the same temperature for additional two hours. The resulting varnish had a solid content of 39.8% and an acid number of 200 mg KOH/g of the solid.

Example 2

To the same flask as used in Example 1 were added 100 parts of xylene and 20 parts of n-butanol, and the content was heated to 100°-110° C. To this was added a mixture of 25.7 parts of acrylic acid, 57.8 parts of ethyl acrylate, and 3 parts of azobisisobutyronitrile over one hour. After the addition, the mixture was kept at the same temperature for additional two hours. The resulting varnish had a solid content of 39.6% and an acid number of 200 mg KOH/g of the solid.

Example 3

To the same flask as used in Example 1 were added 100 parts of xylene and 20 parts of n-butanol, and the content was heated to 100°-110° C. To this was added a mixture of 7.7 parts of methacrylic acid, 64.4 parts of methyl methacrylate, 28 parts of 2-ethylhexyl acrylate and 3 parts azobisisobutyronitrile over 4 hours. After the addition, the mixture was kept at the same temperature for additional two hours. The resulting varnish had a solid content of 39.8% and an acid number of 50 mg KOH/g of the solid.

Example 4

To the same flask as used in Example 1 were added 100 parts of xylene and 20 parts of n-butanol, and the content was heated to 100°-110° C. To this was added a mixture of 38.5 parts of acrylic acid, 50.9 parts of ethyl acrylate, 10.6 parts of n-butyl acrylate and 3 parts of azobisisobutyronitrile over four hours. After the addition, the mixture was kept at the same temperature for additional 30 minutes. The resulting varnish had a solid content of 39.4% and an acid number of 300 mg KOH/g of the solid.

PRODUCTION OF POLYMER HYBRID SALTS

Example 5

A four necked flask equipped with a stirrer, a reflux condenser and a decanter was charged with 100 parts of the varnish of Example 1, 20 parts of naphthenic acid and 7 parts of copper (II) hydroxide. The mixture was heated at 120° C. for two hours while distilling off water produced as a by-product. A green varnish hereinafter referred to as "Varnish A" having a solid content of 51.3% and a viscosity of 2.2 poise was obtained. An aliquot of the varnish was treated with white spirit to precipitate the resin and analyzed for its copper content by fluorescent X-ray analysis. The copper content was 6.8%.

Example 6

The same flask as used in Example 5 was charged with 100 parts of the varnish of Example 2, 25.9 parts of zinc (II) acetate, 40.3 parts of oleic acid and 120 parts of xylene. The mixture was heated at 120° C. while removing acetic acid by azeotropic distillation with xylene. The reaction was continued until no acetic acid was detected in the distillate. Varnish B thus produced had a solid content of 55.3% and a viscosity of R−S.

Example 7

The same flask as used in Example 5 was charged with 100 parts of the varnish of Example 3, 7.4 parts of copper (II) propionate, 10 parts of naphthenic acid and 10 parts of deionized water. The mixture was heated at 100°.C. while distilling off water and propionic acid. The reaction was continued until no distillate was collected. Varnish C thus produced had a solid content of 52.3% and a viscosity of P.

Example 8

The same flask as used in Example 5 was charged with 100 parts of the varnish of Example 3, 8.1 parts of manganese (II) acetate and 7.8 parts of 2,4-dichlorophenoxyacetic acid. The mixture was heated at 70° C. while distilling off acetic acid. The reaction was continued until no acetic acid was detected in the distillate. Varnish D thus produced was diluted with 95 parts of xylene to a solid content of 56.3% and a viscosity of U.

Example 9

The same flask as used in Example 5 was charged with 100 parts of the varnish of Example 4, 37.2 parts of cobalt (II) acetate, 32.1 parts of Versatic acid and 120 parts of xylene. The mixture was heated at 120° C. while removing acetic acid by azeotropic distillation with xylene. Varnish E thus produced had a solid content of 55.8% and a viscosity of N.

POLYMER COMPLEX VARNISH

Examples 10-20 and Comparative Example 1

Varnish A to Varnish E produced in Example 5-9 were complexed by mixing with various ligands as shown Table 1 below. As a control, Varnish A was used in Comparative Example 1 without addition of any ligand.

Ligands used in these examples are as follows:
A: Hydroquine
B: Nonylphenol
C: N-(3,4-dichlophenyl)-N'-methoxy-N'-methylurea
D: N-(3,4-dichlorophenyl)-N',N'-dimethylurea
E: 3,3,4,4-Tetrachloro-tetrahydrothiophene-1,1-dioxide
F: Geraniol
G: 2,4-Dichlorophenoxyacetic acid
H: 2-Amino-3-chloro-1,4-naphthoquinone
I: Benzoic acid
J: Acetaldhyde

TABLE 1

| | Polymer Complex Varnish | | | | | | | | | | | |
| | Example No. | | | | | | | | | | | |
| | 10 | 11 | 12 | 13 | 14 | 15 | 16 | 17 | 18 | 19 | 20 | Com. 1 |
|---|---|---|---|---|---|---|---|---|---|---|---|---|
| Varnish | A | B | C | D | E | A | A | A | A | A | A | A |
| (parts) | 98 | 98 | 94 | 96 | 94 | 96 | 92 | 95 | 95 | 95 | 97 | 100 |
| Ligand | A | B | C | D | E | F | G | I | J | A B | K | — |
| (parts) | 2 | 2 | 6 | 4 | 6 | 4 | 8 | 5 | 5 | 2 3 | 3 | — |
| Total (parts) | 100 | 100 | 100 | 100 | 100 | 100 | 100 | 100 | 100 | 100 | 100 | 100 |

Film consumption rate

Polymer complex varnishes of Examples 10-20 and Comparative Example 1 were applied on a rotor disc to a dry film thickness of about 140 μm, and the disc was continuously rotated at a constant circumferential speed of about 30 knot in sea water at a temperature of 18°-22° C. for two months. The film consumption rate was evaluated in terms of the consumed film thickness calculated by subtracting the residual film thickness after 2 month rotation from the initial film thickness. The results obtained are shown in Table 2 below.

$(15 \times 10 \times 0.1$ cm) to a dry film thickness of about 100 μm. The plate was immersed in sea water and the amount of metal ions leached in the sea water was determined over six months period. The results obtained are shown in Table 4 below.

It is evident from Table 4 that a relatively constant metal release is sustained over a long period of time by the paint of the present invention.

TABLE 4

| | Metal Releasing Rate (μg metal/cm² film/day) | | | | | | | | | | | Comp. |
|---|---|---|---|---|---|---|---|---|---|---|---|---|
| | Ex. No. | | | | | | | | | | | |
| Period | 10 | 11 | 12 | 13 | 14 | 15 | 16 | 17 | 18 | 19 | 20 | Ex. 1 |
| 0 | 8 | 7.5 | 6.0 | 6.5 | 9.0 | 6.0 | 6.0 | 7.5 | 6.5 | 9.0 | 6.5 | 10.0 |
| Week 0-2 | 4.0 | 4.0 | 3.5 | 6.0 | 4.0 | 4.5 | 4.5 | 4.5 | 6.0 | 8.5 | 6.0 | 4.0 |
| Week 2-Month 1 | 4.0 | 4.5 | 3.5 | 4.0 | 4.0 | 4.5 | 4.0 | 5.0 | 4.0 | 7.5 | 4.0 | 3.0 |
| Month 1-2 | 3.5 | 4.5 | 4.0 | 4.5 | 4.5 | 3.5 | 4.0 | 5.5 | 4.0 | 7.0 | 4.5 | 2.5 |
| Month 2-3 | 4.0 | 4.0 | 4.5 | 4.0 | 4.0 | 3.0 | 4.5 | 5.0 | 4.0 | 6.0 | 4.0 | 2.0 |
| Month 3-4 | 4.0 | 4.0 | 4.0 | 3.5 | 4.5 | 3.5 | 4.0 | 5.0 | 3.5 | 6.5 | 3.5 | 0.0 |
| Month 4-5 | 3.0 | 4.0 | 4.5 | 3.5 | 4.5 | 4.5 | 4.0 | 5.5 | 3.5 | 7.0 | 3.5 | 0.0 |
| Month 5-6 | 4.0 | 4.0 | 3.5 | 4.0 | 4.5 | 4.0 | 4.0 | 5.0 | 4.0 | 6.5 | 4.0 | 0.0 |

TABLE 2

| | Film Consumption | | |
|---|---|---|---|
| Example No. | Initial film thickness, μm | Residual film thickness, μm | Consumed film thickness, μm |
| 10 | 140 | 60 | 80 |
| 11 | 145 | 25 | 120 |
| 12 | 130 | 30 | 100 |
| 13 | 130 | 50 | 80 |
| 14 | 140 | 80 | 60 |
| 15 | 150 | 50 | 100 |
| 16 | 145 | 45 | 100 |
| 17 | 140 | 50 | 90 |
| 18 | 135 | 55 | 80 |
| 19 | 140 | 0 | >140 |
| 20 | 150 | 50 | 100 |
| Com. Ex. 1 | 150 | 90 | 60 |

It is evident from Table 2 that the film consumption rate can be controlled by selecting a suitable ligand species.

Effect of ligands on varnish viscosity

The varnish of Example 5 was thickened in vacuo to an initial viscosity of 10,000 centipoise. To the varnish was added octyl alcohol or acetic acid, at a ligand-to-metal coordination ratio of 1:1, 2:1 and 4:1, respectively. As a control, xylene was used. Viscosities measured in each test are shown in Table 3 below.

It is evident from Table 3 that the varnish viscosity decreases drastically by the addition of a complexing ligand. This means that the present invention enables a high solids antifouling paint having a solid content greater than 50% to be formulated, whereas a 40% solids content is practically maximum for the corresponding paint not containing the complexing ligand.

TABLE 3

| Effect of Ligand on Varnish Viscosity | | | | |
|---|---|---|---|---|
| | Ligand/metal ratio | | | |
| Ligand | 0 | 1:1 | 2:1 | 4:1 |
| Octyl alcohol | 10000 cp | 1300 cp | 700 cp | 200 cp |
| Acetic acid | 10000 cp | 1100 cp | 400 cp | 200 cp |
| Xylene | 10000 cp | 8000 cp | 6000 cp | 3500 cp |

Metal releasing rate

Varnishes of Examples 10-20 and Comparative Example 1 were applied on a polyvinyl chloride plate

Paint formulations

Using Varnish A of Example 5 to Varnish D of Example 8, various antifouling paints were formulated by the conventional method and tested for storage stability.

Example 21
| | |
|---|---|
| Varnish A | 50 parts |
| Octanol | 5 parts |
| Cu₂O | 30 parts |
| Red iron oxide (Fe₂O₃) | 5 parts |
| Xylene | 5 parts |
| Methyl isobutyl keton (MIK) | 5 parts |
| Total | 100 parts |

Example 22
| | |
|---|---|
| Varnish B | 50 parts |
| Dodecyl alcohol | 5 parts |
| Cu₂O | 30 parts |
| TiO₂ | 5 parts |
| Xylene | 5 parts |
| MIK | 5 parts |
| Total | 100 parts |

Example 23
| | |
|---|---|
| Varnish B | 40 parts |
| Isononanoic acid | 8 parts |
| Cu₂O | 27 parts |
| Fe₂O₃ | 5 parts |
| Xylene | 10 parts |
| MIK | 10 parts |
| Total | 100 parts |

Example 24
| | |
|---|---|
| Varnish B | 50 parts |
| Ethylene glycol | 12 parts |
| Benzoic acid | 3 parts |
| Cu₂O | 20 parts |
| Fe₂O₃ | 5 parts |
| MIK | 10 parts |
| Total | 100 parts |

Example 25
| | |
|---|---|
| Varnish A | 40 parts |
| Octanol | 2 parts |
| Acetic acid | 1 parts |
| Cu₂O | 30 parts |
| Fe₂O₃ | 2 parts |
| ZnO | 10 parts |
| Xylene | 10 parts |
| MIK | 5 parts |
| Total | 100 parts |

Example 26
| | |
|---|---|
| Varnish A | 45 parts |
| Acetic acid | 0.5 parts |
| Cu₂O | 5 parts |

-continued

| | |
|---|---|
| Fe$_2$O$_3$ | 5 parts |
| ZnO | 25 parts |
| Xylene | 9.5 parts |
| MIK | 10 parts |
| Total | 100 parts |

Example 27

| | |
|---|---|
| Varnish A | 50 parts |
| Nitrobenzene | 3 parts |
| Cu$_2$O | 30 parts |
| Fe$_2$O$_3$ | 5 parts |
| Xylene | 7 parts |
| MIK | 5 parts |
| Total | 100 parts |

Example 28

| | |
|---|---|
| Varnish B | 50 parts |
| Isophthalonitrile | 10 parts |
| Cu$_2$O | 25 parts |
| TiO$_2$ | 5 parts |
| Xylene | 5 parts |
| MIK | 5 parts |
| Total | 100 parts |

Example 29

| | |
|---|---|
| Varnish C | 50 parts |
| Hydroquinone monomethyl ether | 7 parts |
| Cu$_2$O | 23 parts |
| ZnO | 10 parts |
| MIK | 10 parts |
| Total | 100 parts |

Example 30

| | |
|---|---|
| Varnish A | 40 parts |
| Octylphenol | 12 parts |
| TiO$_2$ | 5 parts |
| ZnO | 23 parts |
| Xylene | 10 parts |
| MIK | 10 parts |
| Total | 100 parts |

Example 31

| | |
|---|---|
| Varnish B | 40 parts |
| Hydroquinone | 2 parts |
| CuSCN | 23 parts |
| TiO$_2$ | 10 parts |
| Xylene | 15 parts |
| MIK | 10 parts |
| Total | 100 parts |

Example 32

| | |
|---|---|
| Varnish C | 40 parts |
| BHT | 6 parts |
| Cu$_2$O | 5 parts |
| ZnO | 30 parts |
| Xylene | 10 parts |
| MIK | 9 parts |
| Total | 100 parts |

Example 33

| | |
|---|---|
| Varnish B | 40 parts |
| Nonylphenol | 5 parts |
| Cu$_2$O | 25 parts |
| Fe$_2$O$_3$ | 5 parts |
| Xylene | 15 parts |
| MIK | 10 parts |
| Total | 100 parts |

Example 34

| | |
|---|---|
| Varnish D | 50 parts |
| N,N-dimethyl-N'-phenylurea | 8 parts |
| Cu$_2$O | 10 parts |
| ZnO | 20 parts |
| Xylene | 2 parts |
| MIK | 10 parts |
| Total | 100 parts |

Example 35

| | |
|---|---|
| Varnish B | 50 parts |
| N-(3,4-dichlorophenyl)-N'-methoxy-N-methylurea | 12 parts |
| Cu$_2$O | 20 parts |
| Fe$_2$O$_3$ | 5 parts |
| MIK | 10 parts |
| Total | 100 parts |

Example 36

| | |
|---|---|
| Varnish A | 40 parts |
| N-(3,4-dichlorophenyl)-N',N'-dimethylurea | 5 parts |
| Cu$_2$O | 30 parts |
| ZnO | 10 parts |
| Xylene | 10 parts |
| MIK | 5 parts |
| Total | 100 parts |

Example 37

| | |
|---|---|
| Varnish A | 45 parts |
| 3,3,4,4-Tetrachloro-tetrahydrothiophene-1,1-dioxide | 5 parts |
| Fe$_2$O$_3$ | 15 parts |
| ZnO | 15 parts |
| Xylene | 10 parts |
| MIK | 10 parts |
| Total | 100 parts |

Example 38

| | |
|---|---|
| Varnish C | 50 parts |
| Hydroquinone | 1 parts |
| Nonylphenol | 4 parts |
| CuSCN | 20 parts |
| ZnO | 10 parts |
| Xylene | 10 parts |
| MIK | 5 parts |
| Total | 100 parts |

Comparative Example 2

| | |
|---|---|
| Varnish A | 50 parts |
| Cu$_2$O | 30 parts |
| Fe$_2$O$_3$ | 5 parts |
| Xylene | 10 parts |
| MIK | 5 parts |
| Total | 100 parts |

Comparative Example 3

| | |
|---|---|
| Varnish B | 40 parts |
| CuSCN | 25 parts |
| TiO$_2$ | 10 parts |
| Xylene | 15 parts |
| MIK | 5 parts |
| Total | 100 parts |

Comparative Example 4

| | |
|---|---|
| Varnish A | 45 parts |
| Cu$_2$O | 5 parts |
| Fe$_2$O$_3$ | 5 parts |
| ZnO | 25 parts |
| Xylene | 10 parts |
| MIK | 10 parts |
| Total | 100 parts |

Comparative Example 5

| | |
|---|---|
| Varnish C | 50 parts |
| CuSCN | 20 parts |
| ZnO | 10 parts |
| Xylene | 15 parts |
| MIK | 5 parts |
| Total | 100 parts |

Comparative Example 6

| | |
|---|---|
| Varnish D | 50 parts |
| Cu$_2$O | 10 parts |
| ZnO | 20 parts |
| Xylene | 8 parts |
| MIK | 10 parts |
| Total | 100 parts |

Comparative Example 7

| | |
|---|---|
| Varnish B | 40 parts |
| Cu$_2$O | 25 parts |
| Fe$_2$O$_3$ | 5 parts |
| Xylene | 15 parts |
| MIK | 15 parts |
| Total | 100 parts |

Storage stability

Antifouling paint formulations of Examples 21–38 and Comparative Examples 2–7 were tested for stability during storage.

A 250 ml aliquot of each paint was placed in a 300 ml glass container and sealed therein. Storage stability was evaluated in terms of varnish separation, precipitation and viscosity increase after storaging for one month at 50° C. The results obtained are shown in Table 5 below.

TABLE 5

| Example No. | Storage Stability | | | Overall judgement |
|---|---|---|---|---|
| | Varnish separation | Precipitate | Viscosity increase | |
| 21 | None | None | Substantially no change | Very good |
| 22 | " | " | Substantially no change | " |
| 23 | " | " | Substantially no change | " |
| 24 | " | Soft ppt. | Slight | Good |
| 25 | " | None | Substantially no change | Very good |
| 26 | " | " | Substantially no change | " |
| 27 | " | " | Substantially no change | " |
| 28 | " | " | Substantially no change | " |
| 29 | " | " | Substantially no change | " |
| 30 | " | Soft ppt. | Substantially no change | Good |
| 31 | " | None | Substantially no change | Very good |
| 32 | " | " | Substantially no change | " |
| 33 | " | " | Substantially no change | " |
| 34 | " | " | Substantially no change | " |
| 35 | " | " | Substantially no change | " |
| 36 | " | " | Substantially no change | " |
| 37 | " | " | Substantially no change | " |
| 38 | " | " | Substantially no change | " |
| Comp. | | | | |
| Ex. 2 | Yes | Hard ppt. | Remarkable | Not good |
| Ex. 3 | None | " | " | " |
| Ex. 4 | Yes | " | Gelling | " |
| Ex. 5 | None | " | Remarkable | " |
| Ex. 6 | Yes | " | " | " |
| Ex. 7 | None | " | " | " |

We claim:

1. An antifouling paint composition comprising:
   (a) a copolymer consisting essentially of 5 to 80% by weight of a first recurring unit of the formula:

wherein $R^1$ is hydrogen atom, methyl or an alkoxycarbonyl, $R^2$ is hydrogen atom or an alkoxycarbonyl, A is an acid ion-terminated pendant group, M is a transitional metal ion, L is a monobasic organic acid ion, and m is the valency of the transitional metal M; and the balance of the copolymer of a second recurring unit free from an acid function, said copolymer having a number average molecular weight from 2,000 to 100,000: and
   (b) an amount of an organic ligand at least equal to a ligand-to-metal coordination ratio of 1:1,
said organic ligand being selected from the group consisting of aromatic nitro compounds, nitriles, urea compounds, alcohols, phenols, aldehydes, ketones, carboxylic acids and organic sulfur compounds.

2. The antifouling paint composition according to claim 1, wherein said transitional metal is Co, Ni, Cu, Zn or Mn.

3. The antifouling paint composition according to claim 1 further comprising a biostatically effective amount of $Cu_2O$ or CuSCN.

4. The antifouling paint composition according to claim 1 further comprising a metal oxide pigment.

5. The antifouling paint composition according to claim 1, wherein said monobasic organic acid ion is a monocarboxylate anion.

6. The antifouling paint composition according to claim 1, wherein said monobasic organic acid ion is a sulfonate anion.

7. The antifouling paint composition according to claim 1, wherein said first recurring unit is derived from acrylic acid.

8. The antifouling paint composition according to claim 1, wherein said first recurring unit is derived from methacrylic acid.

9. The antifouling paint composition according to claim 1, wherein said second recurring unit is derived from an ethylenically unsaturated neutral monomer.

10. The antifouling paint composition according to claim 1, wherein said first recurring unit occupies from 30 to 70% by weight of said copolymer.

11. The antifouling paint composition according to claim 1 having a solids content greater than 50% by weight.

12. The antifouling paint composition according to claim 1, wherein said copolymer (a) forms a polymer complex with said organic ligand (b) in situ.

* * * * *